Nov. 15, 1932.  M. NITESCO  1,887,779

HEATING APPARATUS WITH HEAT STORAGE BODY

Filed Aug. 21, 1930   6 Sheets-Sheet 1

MARCEL NITESCO
INVENTOR
BY
his ATTORNEY

Nov. 15, 1932.　　　　M. NITESCO　　　　1,887,779
HEATING APPARATUS WITH HEAT STORAGE BODY
Filed Aug. 21, 1930　　6 Sheets-Sheet 3

Nov. 15, 1932.  M. NITESCO  1,887,779
HEATING APPARATUS WITH HEAT STORAGE BODY
Filed Aug. 21, 1930  6 Sheets-Sheet 6
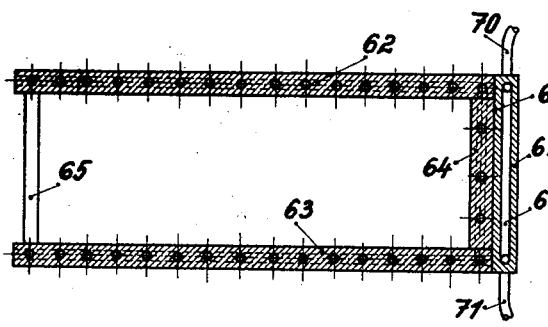
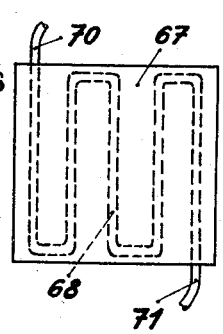
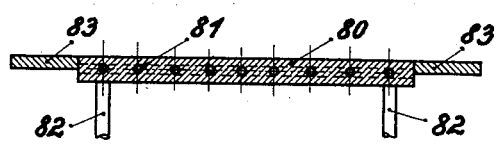
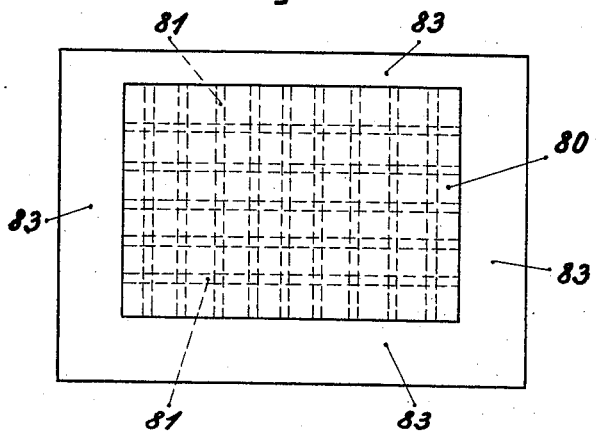
Marcel Nitesco
INVENTOR Patented Nov. 15, 1932

1,887,779

UNITED STATES PATENT OFFICE

MARCEL NITESCO, OF VIENNA, AUSTRIA, ASSIGNOR TO JEAN LAGARRIGUE, OF PARIS, FRANCE

HEATING APPARATUS WITH HEAT-STORAGE BODY

Application filed August 21, 1930, Serial No. 476,835, and in Austria August 27, 1929.

Heating apparatus are already known which comprise as a heat storage device a metal block traversed by endless channels, which are filled once and for all with a vaporizable fluid. The present invention is directed to the problem of producing a heating apparatus of the kind described which makes extensive use of the space available, makes available different temperatures at the same time at different parts of the heating body, and satisfies the requirements arising for different purposes. According to the present invention this is attained by sub-dividing the heat storage body into a number of metal blocks arranged one above the other, the channels in which are connected with one another by means of pipes.

In the accompanying drawings are illustrated a number of constructions of the heat storage body according to the present invention, Fig. 1 being a longitudinal section on the line I—I of Fig. 2 of a heat storage body for a cooking oven, and Fig. 2 a cross section on the line II—II of Fig. 1;

Fig. 7 is a section through a heat storage body heated by means of steam,

Fig. 8 is a side elevation of the apparatus shown in Fig. 7.

Fig. 9 is a partial section through the heat storage body for a cooking oven and Fig. 10 is a plan of the apparatus shown in Fig. 9.

Figure 1:
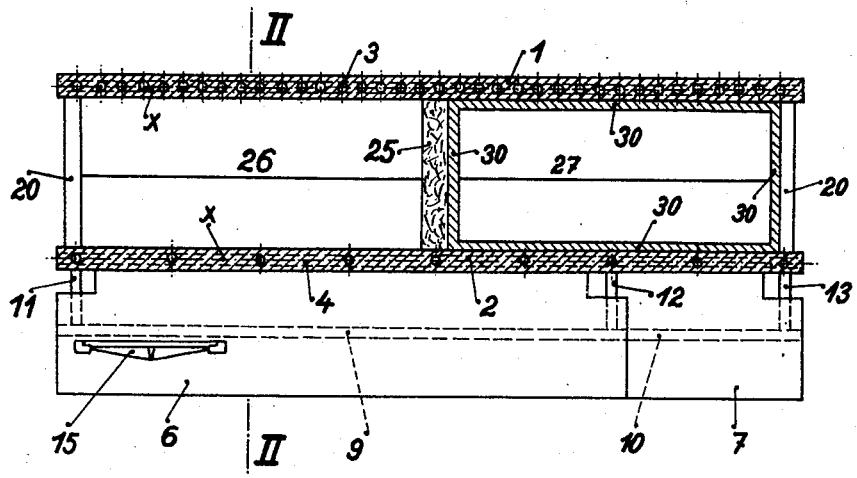
Figure 2:
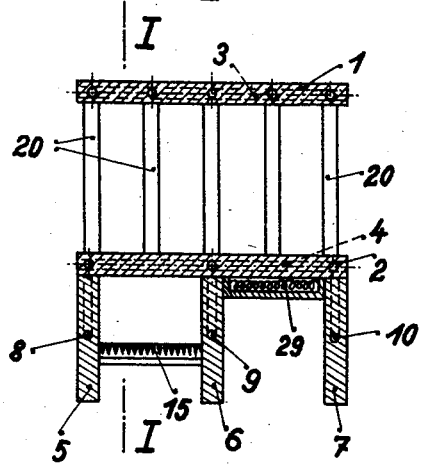
Figure 6:
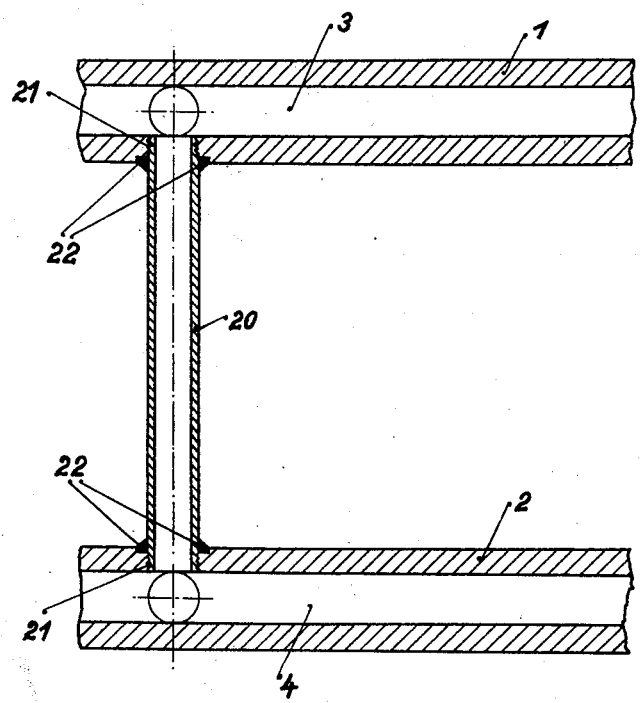
Fig. 6 shows a detail in section.

In the construction according to Figs. 1 and 2 x is the heat storage body which consists of two metal blocks 1 and 2 arranged one above the other. Each of these metal blocks is traversed by an endless channel system 3, 4, which are filled once for all with a vaporizable fluid. Beneath the lower of the two horizontally arranged blocks are arranged three vertically disposed blocks 5, 6 and 7, which likewise are traversed by channels 8, 9 and 10. The channels 8, 9 and 10 are connected with the channel system of the block 2 by means of pipes 11, 12, 13. Between the blocks 5 and 6 is built in a grate 15 which serves for coal firing. The gases of combustion pass from the grate between the blocks 5 and 6 towards the rear, around the block 6 which is made shorter than the other two and forwards between the blocks 6 and 7, to escape thence through the chimney. The channel systems 3 and 4 of the blocks 1 and 2 are connected with one another by Mannesmann tubes 20. These tubes as shown in detail in Fig. 6 are provided at their ends with a screw thread 21 and are screwed into the metal blocks 1 and 2 and welded at 22. These tubes 20 serve at the same time as supports for the block 1. The space between the blocks 1 and 2 is sub-divided into two chambers 26 and 27 by a partition wall 25 of heat insulating material and the chamber 27 is completely covered with heat insulating material 30. The surface of the blocks 1 and 2 is polished in order to guarantee a good transmission of heat to the article to be heated. The spaces 26 and 27 which in use have different temperatures in consequence of the covering 30, serve for roasting or baking, whilst the cooking vessels can be placed upon the outer surface of the block 1. Instead of coal firing, electrical resistance heating can be used to heat the blocks as indicated in Fig. 2 at 29.

Figure 3:
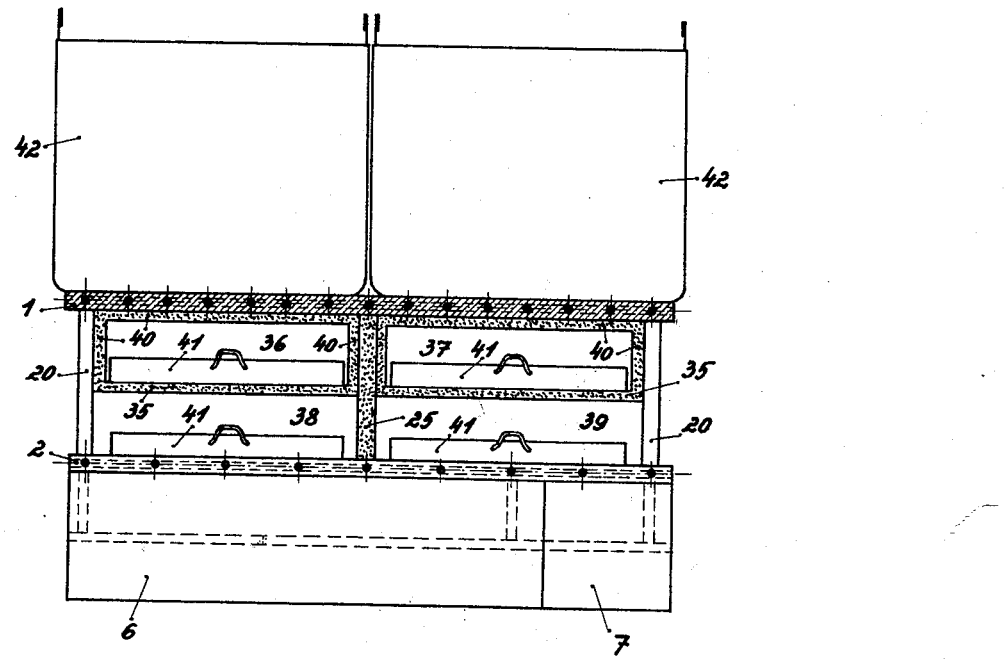
Fig. 3 is a vertical section through a storage body of an oven of another construction.

In the construction according to Fig. 3 the space between the blocks 1 and 2 is sub-divided by the insulating partitions 25 and 35 into four chambers 36, 37, 38 and 39, of which the chambers 36 and 37 are provided with a covering 40 of insulating material. The chambers 36 and 39 serve for receiving the pans 41 or the like, whilst the cooking vessels 42 are placed on the top of the block 1.

Figure 4:
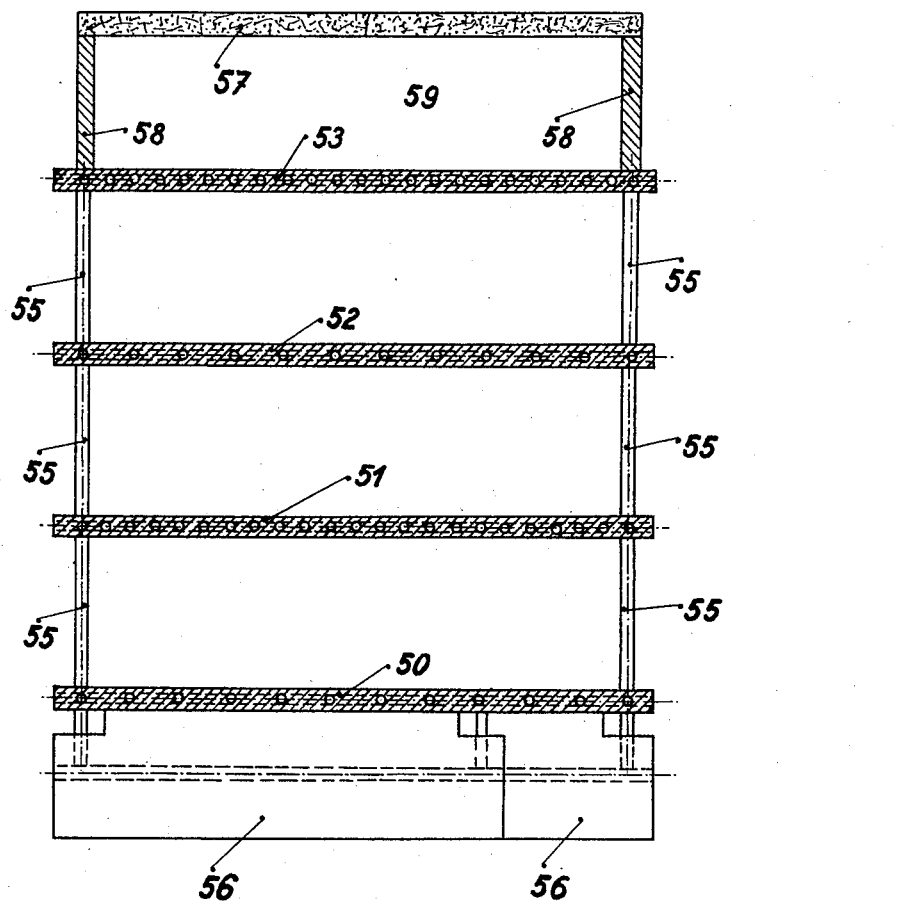
Fig. 4 is a vertical section through a heat storage body for a bread baking oven.

Fig. 4 shows a construction in which the heat storage chamber is sub-divided into four metal blocks 50, 51, 52 and 53. The blocks 51—53 are carried by supports 55 made of Mannesmann tubes and they serve simultaneously to connect the channel systems of these blocks. Beneath the block 50, as in the construction described with reference to Figs 1 and 2, are vertical blocks 56 which are heated by a source of heat not illustrated and their channel systems are connected by means of pipes with the channel systems of the remaining blocks. Upon the block 53 is placed a chamber 59 made of heat insulating material 58. This heating body is particularly applicable for use in bread baking ovens. In the chamber contained by the walls 58 the temperature is in use lower than in the spaces between the metal blocks 50 and 53.

Figure 5:
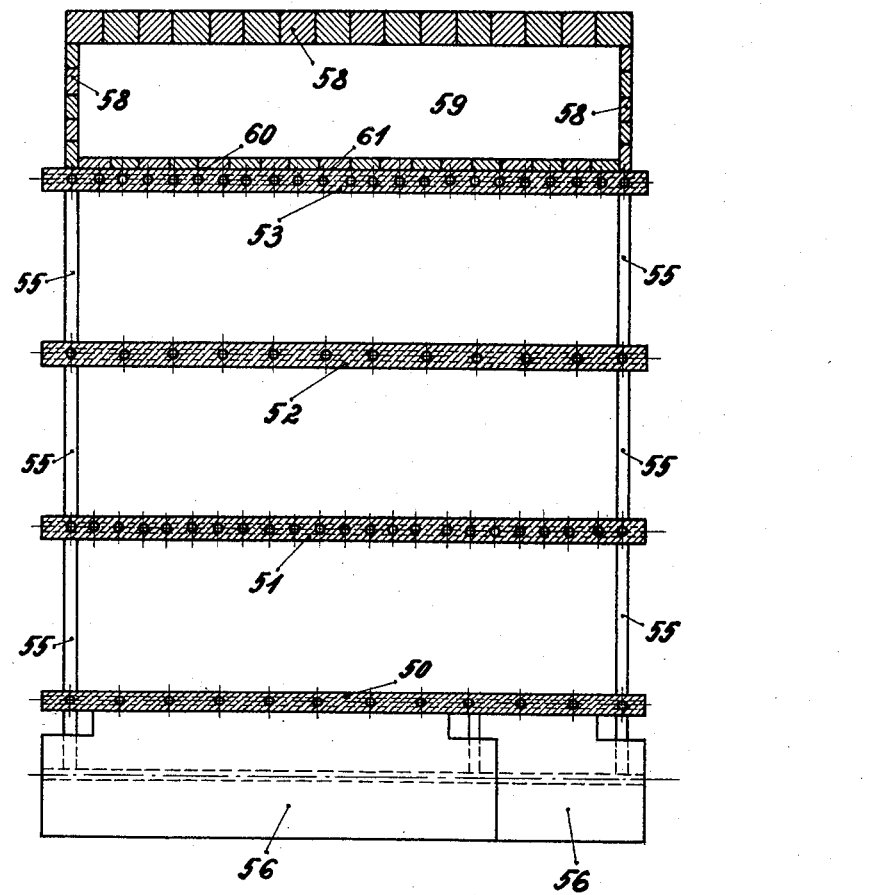
Fig. 5 is a similar section through the heat storage body for a confectionery baking oven.

Fig. 5 shows a heat storage body of the same kind as in Fig. 4 which can be used with advantage, particularly for confectionery purposes. In this heat storage body the chamber that is constructed upon the metal block 53 is enclosed on its sides and above by heat insulating walls 58, but is also divided by means of an insulating layer 61 from the heat emitting surface 60 of the block 53, so that in this chamber the heat is only temperate as is required for some confectionery goods.

The channels provided in the individual parts of the metal block may be arranged at different distances from one another. Thus, for example, in Fig. 4 the channels in the blocks 51 and 53 are nearer together than the channels in the blocks 50 and 52. By this means the blocks 51 and 53 are in use brought to a higher temperature than the blocks 50 and 52. It is also possible in one and the same block portion to arrange the channels nearer together at points which in use are required to give a higher temperature, and to provide other parts which are only required to have a lower temperature, for example, for keeping food warm, with channels lying far apart. By suitable selection of the distance of the channels from one another and by covering the spaces between the blocks with insulating material it is possible to have in one heating apparatus a great variety of temperatures at disposal.

Fig. 7 shows a heat storage body which consists of two horizontally arranged metal blocks 62 and 63 and a vertically arranged metal block 64. The block 64 and the Mannesmann tubes 65 form supports for the block 62. The outer vertical face 66 of the block 64 is polished. 67 is a metal body which is traversed by a steam pipe 68. 70 is the steam supply and at 71 the steam is led off.

The feed pipe 70 can be connected to any convenient central steam producer. If the block 64 and with it the blocks 62 and 63 are to be heated, the metal body 67 which may be transportable on wheels, is pushed up against the polished surface of the block 64 so as to provide a good heat conducting contact.

In the construction illustrated in Figs. 9 and 10, 80 is one of the metal blocks of the heat storage body for a cooking oven. This block as in the examples described above, is traversed by a channel system 81 and is connected by Mannesmann tubes 82 with further metal blocks. Around the block 80 is arranged a frame 83 of metal (cast iron, copper or the like) which is in good heat conducting connection with the block 80. When the oven is in use this frame 83 will heat up to moderate temperature and can be used for carrying food which is to be kept warm. The width of the frame can be varied according to local requirements, on different sides of the block.

In the above described heat storage bodies the metal blocks must, of course, be enclosed in a heat insulating body which prevents the undesired dissipation of heat outwards. It is also possible, in order to obtain a larger surface for carrying articles to be heated, to build a number of metal blocks of normal type of the kind described, one beside the other, into one insulating body.

What I claim is:

1. Heating apparatus comprising two or more superimposed metallic heating blocks, each traversed by a system of endless channels, a vaporizable liquid in said channels, the said blocks being mounted one above the other by means of vertical tubes connecting said systems of channels to one another and supporting the blocks above one another.

2. A heat storage body, as claimed in claim 1, comprising a chamber formed of heat insulating material mounted on one of said blocks, said block having a heat radiating surface, and an insulating layer interposed between said chamber and the surface radiating the heat.

3. Heating apparatus according to claim 1 comprising two or more heating chambers arranged between the blocks and the intervals between the channels being different in different blocks in a manner to heat the different chambers to different temperatures.

4. The combination of a heat storage body as claimed in claim 1 with a metal body traversed by a steam pipe and adapted to be laid against a heating surface of the heat storage body to heat the blocks by steam or to generate steam in said pipe.

5. A heating apparatus as claimed in claim 1, in which the distance between the channels are different at different parts of the block, so that different temperatures may be obtained at different parts of the heating surface of the block.

6. A heating apparatus as claimed in claim 1 comprising a metal body surrounding said block and being in heat conducting connection therewith to keep up a moderate temperature on said metal frame.

In testimony whereof I affix my signature.

MARCEL NITESCO.